United States Patent [19]

Muller et al.

[11] 4,034,155

[45] July 5, 1977

[54] ELECTRICAL SENSING WRITING PEN

[75] Inventors: Alex Marcel Muller; Joseph Leslie Tyrrell, both of Palos Verdes, Calif.

[73] Assignee: Telautograph Corporation, Los Angeles, Calif.

[22] Filed: Apr. 19, 1976

[21] Appl. No.: 677,872

[52] U.S. Cl. .................... 178/19; 340/146.3 SY; 346/139 C
[51] Int. Cl.[2] .................... G08C 21/00; H04N 1/00
[58] Field of Search .................... 235/61.11 H; 340/146.3 SY, 324 R, 324 AD; 324/32, 158 P, 72.5; 178/18, 19; 346/139 C

[56] References Cited

UNITED STATES PATENTS

| 3,444,465 | 5/1969 | Teixeira | 324/72.5 |
| 3,886,311 | 5/1975 | Rodgers et al. | 178/18 |

*Primary Examiner*—Thomas A. Robinson
*Attorney, Agent, or Firm*—Lindenberg, Freilich, et al.

[57] ABSTRACT

A writing pen capacitively detects and amplifies signals generated by a writing table that produces a varying electrostatic field near its writing surface. The pen cartridge, which senses the signal, is capacitively coupled to a concentric electrode, from which the signal which has been detected may be obtained for amplification.

14 Claims, 4 Drawing Figures

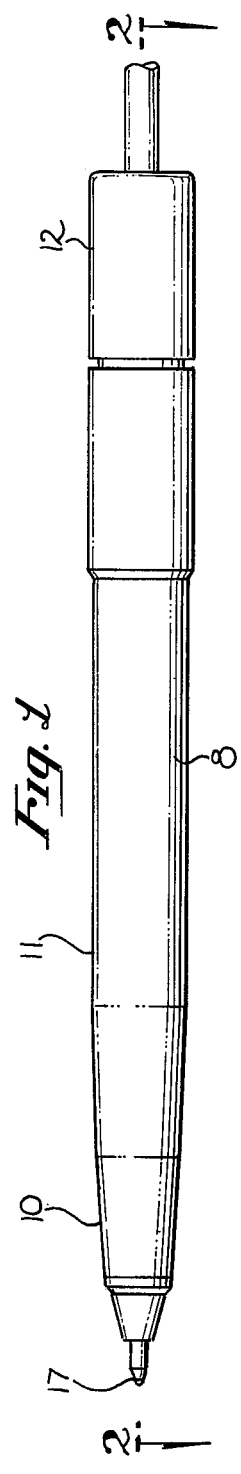
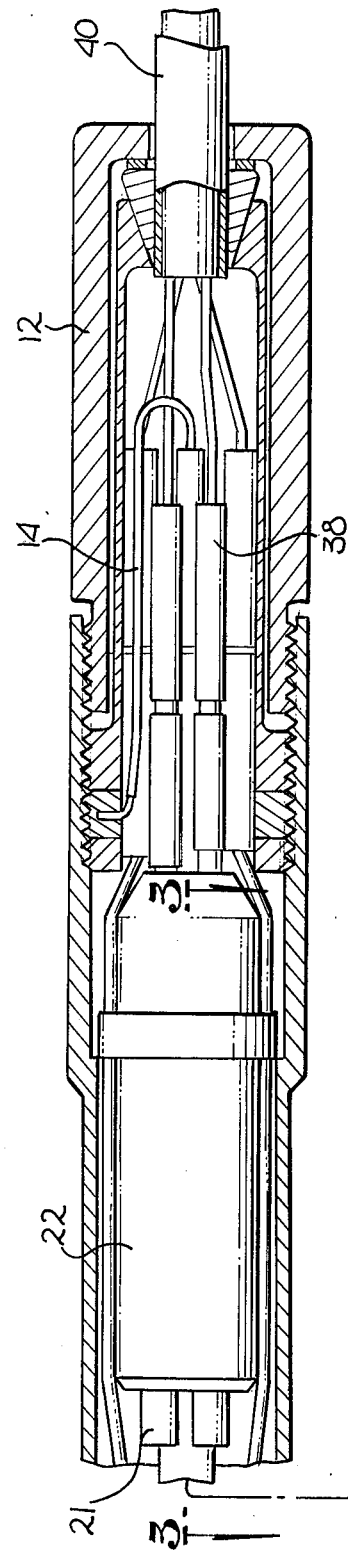
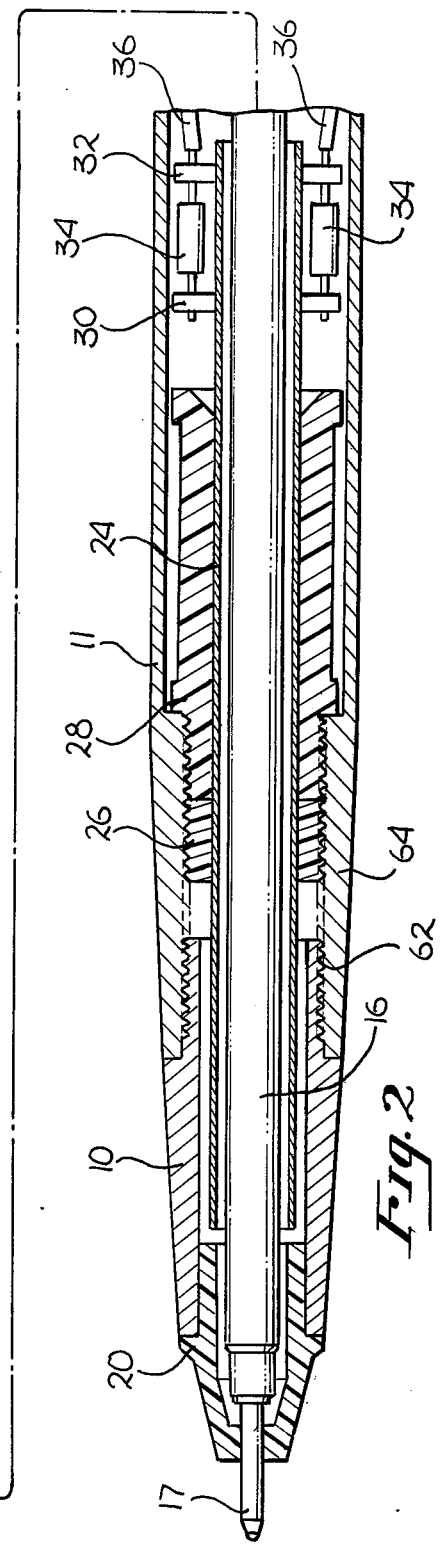
Fig. 1
Fig. 2

ELECTRICAL SENSING WRITING PEN

FIELD OF THE INVENTION

This invention relates to the field of electronic sensors and in particular to a sensor capable of sensing and amplifying a varying electrostatic signal.

PRIOR ART

Various approaches have been taken to develop an effective method for generating an electrical signal indicative of the position of a writing instrument in relation to a writing surface. One of these approaches is to encode position information in an electric field distributed across a writing surface. Then, as a specially designed pen is moved across the writing surface, the pen senses the electrostatic field unique to a position on the surface and generates a signal reflective of this position. One such writing surface is disclosed in U.S. Pat. No. 3,767,858 wherein an electrostatic field is set up by a grid of conducting wires embedded in a writing table. Each wire is connected to the wires parallel and adjacent to it by resistors. The two outermost wires perpendicular to the X-axis are pulsed with signals of the same fixed frequency but different phase. This causes the X-wires to set up an alternating electrostatic field of that same fixed frequency but whose phase varies with the position in the X direction. In a similar manner the wires perpendicular to the Y axis are pulsed by a second fixed frequency but different phase. This sets up an additional alternating electrostatic field of the second fixed frequency whose phase varies with position in the Y direction.

What is required to be used in conjunction with such a writing surface is a specially designed pen which will sense the frequencies and phases of the electrostatic field at a particular position on the surface and generate a corresponding signal indicative of such a position. Since the signal level of the electrostatic field is very low, the pen must be sufficiently sensitive to detect a low-level electrostatic signal. Furthermore, the pen should provide an initial amplification of the sensed signal without amplifying unwanted, capacitively induced signals. Finally, the pen should provide a convenient, yet reliable, switching mechanism so as to enable its operability.

One prior art attempt to provide the capabilities noted above is described by Rodgers, et al, U.S. Pat. No. 3,886,311. The pen described by Rodgers senses the varying electrostatic field by means of a metal or other electrically conductive pen point. By placing the pen point near the electrostatic field, the field is induced in and distributed along the body of the short, electrically conductive point. Near the pen tip is a coil of wire which coaxially surrounds a small portion of the pen point. Through capacitive coupling the signal, distributed near the coil of wire, is induced into the sensing coil. This sensed signal is then electrically coupled along a substantial portion of the inner body of the pen to a pre-amplifier. After electronically amplifying the sensed signal, the preamplifier is electrically coupled to the exterior of the pen.

Also disposed within the prior art's pen is a single pole, single throw, mechanical push-button switch. This switch is threaded into the inner-cavity of the pen body such that the blunt end of the ball-point pen cartridge used in the pen is positioned near the extremity of the push-button. Thus, the switch is actuated when the pen cartridge is inwardly displaced a distance greater than the sum of the travel required for actuation of the switch and the gap distance maintained between the cartridge end and push-button extremity.

The prior art pen illustrates several of the problems associated with the implementation of the basic concepts utilized therein. First, the sensitivity of the pen is limited by the method of coupling the sensed signal from the pen point to the pre-amplifier. Here the sensed signal must be sufficiently strong in amplitude so that an electrostatic field existing in very close proximity to the sensing coil will be induced into the coil. Thus, the sensitivity is greatly limited by the size, shape, and number of turns of wire in a coil which must be imbedded in the very limited space available in the tip of the pen.

Secondly, the signal to noise ratio of the sensed signal is directly proportional to the distance the very low level sensed-signal must travel before it is initially amplified. That is, despite attempts to shield such a signal, it is still prone to corruption by stray capacitive introduction of undesired signals and noise while it is being coupled to the preamplifier. This lowered signal to noise ratio is very undesirable because it will create erroneous position signals. This problem may be particularly apparent in the prior art pen wherein the low level sensed signal must travel virtually the length of the pen before it is amplified.

A third shortcoming in such a pen is the lack of an effective and reliable switching mechanism wherein the pen may be maintained in an operable mode merely by initiating usage of the pen. Thus, to activate the switch utilized in the Rodgers pen, the pen point must be depressed such that the pen cartridge moves inwardly a distance greater than the gap maintained between the switch push-button and the cartridge extremity, and the distance required to activate the switch. Thus, if during usage of the pen, pressure is lightened on the pen such that this minimum inward travel of the cartridge is not maintained, the pen circuitry will be deactivated. Furthermore, a mechanical switch, small enough to fit within the cavity of a pen, which is activated by countless movements of varying force must have a greatly limited life expectancy.

Accordingly, it is a general object of the present invention to provide an improved pen-type sensing device.

It is another object of the present invention to provide a pen-type sensing device having increased sensitivity.

It is a further object of the present invention to provide a pen-type sensing device which has an improved signal to noise ratio.

A still further objective of the present invention is to provide a pen-type sensing device which has an improved switching mechanism.

SUMMARY OF THE INVENTION

A writing pen capable of sensing and amplifying a varying electrostatic field is disclosed. A tubular member, electrically shielded from the outside electrostatic field, is mounted inside the pen housing and coaxially surrounds a substantial portion of the metallic pen cartridge. The pen point is exposed to the electrostatic field and the signal sensed by the pen point is conducted up the entire length of the metallic pen cartridge. The capacitive coupling between the pen cartridge and the surrounding tubular member causes the varying signal to be transferred to the tubular member. Circuitry for amplifying the signal is mounted directly on the tubular member thereby reducing the introduction of stray noise signals prior to amplification.

The novel features which are believed to be characteristic of the invention, both as to its organazation and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a perspective view of the sensing pen.

FIG. 2 is a cutaway view of the sensing pen showing its internal construction.

DETAILED DESCRIPTION OF THE INVENTION

Figure 3:
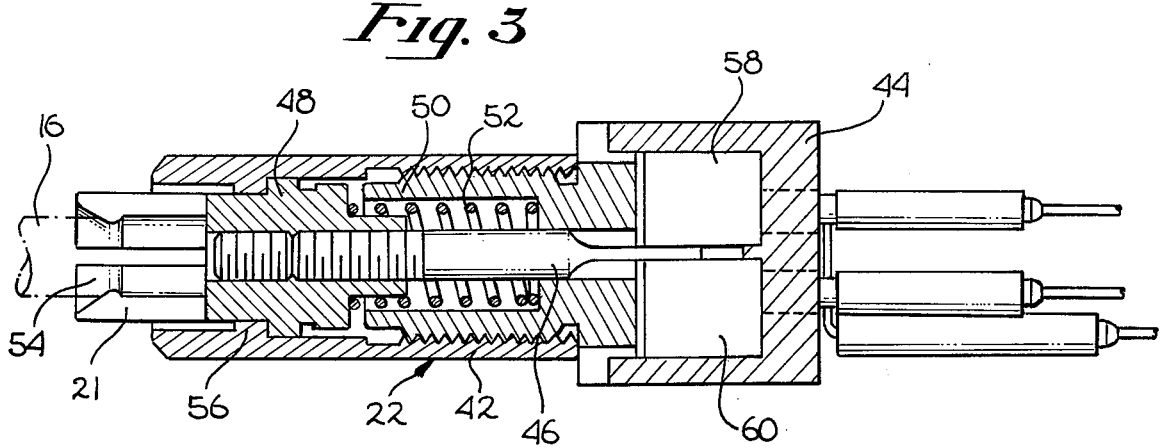
FIG. 3 is a cutaway view of the switch assembly shown in its unactivated position.

A preferred embodiment of a sensing pen utilizing the present invention is shown in detail in FIGS. 1 and 2. The outside housing of sensing pen 8 is comprised of a lower body 10, an upper body 11, and an end cap 12. These parts are made of aluminum which is light in weight and which provides an electrical shield. The aluminum housing is grounded internally by conducting cable 14.

The pick-up element is comprised of a cylindrical body portion, metallic pen cartridge 16, and a tip portion, pen tip 17. This pick-up element is axially, slideably disposed within the housing of sensing pen 8, and is precisely aligned by plastic bearing 20 and non-conducting base 21 of pressure switch assembly 22. Thus, pen cartridge 16 is supported such that it is insulated from any conducting element, while the precise alignment afforded by bearing 20 and base 21 allows consistent capacitive coupling upon pen cartridge replacement.

The electrostatic field is sensed by the metallic pen tip 17 and the part of the cartridge 16 which is electrostatically exposed by the plastic bearing 20. The cartridge 16 is shielded further up the length thereof by the aluminum lower body 10. The signal sensed near the tip 17 is conducted throughout the entire cartridge 16. A coupling means, metallic tubular member 24 is held in place by a plastic lock-nut 26 and a plastic adapter nut 28 and coaxially surrounds a large portion of the length of the conducting cartridge 16. The tubular member 24 is also insulated from any conducting element. The signal sensed and conducted throughout the pen cartridge 16 is transferred to the tubular member 24 by capacitive coupling. Tubular member 24 is shielded from outside signals by the lower and upper bodies 10 and 11 of the grounded aluminum pen housing. Because the entire interior surface of the tubular member 24 is adjacent to the pen cartridge 16, the capacitive coupling between member 24 and the cartridge 16 is maximized thereby maximizing the sensitivity of the pen-type sensor.

Two annular non-conductive printed circuit (PC) boards 30 and 32 are mounted outside and around tubular member 24 and between member 24 and the upper body 11 of the aluminum housing. The electronic circuit components 34 mounted on and between the PC boards 30 and 32 comprise an amplifying circuit to amplify the signal from tubular member 24. The input to the amplifier circuit is coupled to member 24 by a very short conducting lead PC board 30. This direct coupling of the sensed signal from tubular member 24 to the input of the amplifier circuitry virtually eliminates the introduction of noise into the desired signal. Thus, the signal to noise ratio may be greatly increased by the amplifier without also amplifying undesired noise.

FIG. 2 also illustrates the sensing pen's advantageous facility for replacement of a used pen cartridge. Lower body 10 has a plurality of threads 62 extending about its periphery. Upper body 11 also has a plurality of threads 64, extending about its periphery, which cooperate with threads 62 and thereby allow lower body 10 to be threaded into upper body 11. This manner of coupling provides the capability for removing lower body 10 from pen 8, and thus allowing convenient removal of pen cartridge 16. Also, by providing this replacement capability near the pen tip end of sensing pen 8, a cartridge may be replaced without disconnecting signal connectors 38. Thus, potentially broken wires and connectors are avoided, as is contamination of the connector surfaces. This prevention of contamination and its resulting constancy of conductivity is especially important in the present application due to the low level of sensed and amplified signal.

Figure 4:
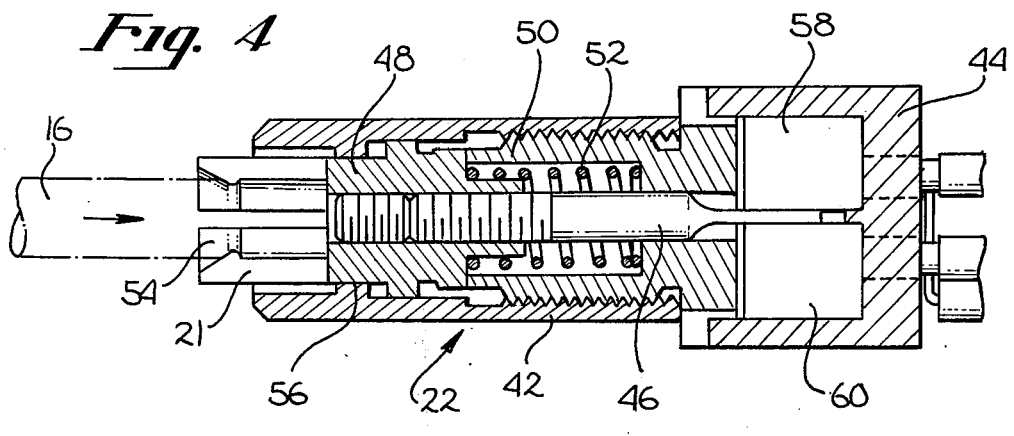
FIG. 4 is a cutaway view of the switch assembly shown in its activated position.

Now referring to FIG. 3 and 4, the components and configuration of switch assembly 22 may be more clearly understood. Enclosing switch assembly 22 are spring housing 42 and circuitry housing 44.

Disposed within housing 42 are pen cartridge base 21, shaft 46, shaft guide 48, guide stop 50 and helical spring 52. The components within housing 42 are adapted such that the blunt end of a pen cartridge will fit snugly within opening 54 of base 21. Base 21 is, in turn coupled to shaft 46 and shaft guide 48. Abutting guide 48 and coaxially surrounding shaft 46 is helical spring 52; this spring is positioned within housing 42 by being circumferentially enclosed by the interior surface of guide stop 50. The components within housing 42 are further adapted such that base 21, guide 48 and shaft 46 may slide axially inward through housing 42 until stopped by the abutment of guide 48 with guide stop 50. Resisting this inward movement is the urging of spring 52 on shaft guide 48. Base 21, guide 48 and shaft 46 may also slide axially outward through housing 42 until guide 48 abuts inward directed flange 50 which is coupled to housing 42. This outward axial movement is urged by the force of compressed spring 52 on shaft guide 48.

Coupled to spring housing 42, adjacent guide stop 50, is circuitry housing 44. Disposed with housing 44 are light source 58, light detector circuitry 60 and the extremity of shaft 46. Source 58 and detector 60 are disposed within housing 44 such that when shaft 46 is in its extreme outward axial position, light from source 58 will impinge upon dectector 60, and when shaft 46 is in its extreme inward axial position, shaft 46 will block passage of light from source 58 to detector 60.

Switch assembly 22 is disposed within upper body 11 of the pen housing such that the blunt end of pen cartridge 16 fits within opening 54 in base 21 of the switch assembly. In operation, the switch is actuated when pen tip 17 is pressed against the writing surface. When between 15 and 25 grams of pressure is exerted on the pen tip, shaft 46 will slide axially inward and thereby interrupt the passage of light from source 58 to detecting circuitry 60. This interruption of light will, in turn, provide an electrical signal indicating that the sensing pen is being used. When the pen is lifted from the writing surface, spring 52 will provide the force necessary to slide shaft 46 axially outward so that the light from source 58 may again impinge on detecting circuitry 60 and thereby provide an electrical signal indicating that the sensing pen is not being used.

Switch assembly 22 provides both an effective and reliable switching mechanism. Through this configuration a very precise indication of pen utilization is automatically provided. That is, switch 22 may be adjusted so that a predetermined amount of inward movement of pen tip 17 is required to provide an electrical indication of pen usage, while this indication will remain despite the greatly varying presssures on the pen tip encountered in typical writing. Furthermore, switch assembly 22 is more reliable than a commercial mechanical switch since the contact points inherent in a mechanical switch are eliminated. At the low interface forces required in this application mechanical contact points are a source of failure.

In the presently preferred embodiment, light source 58 is a light emitting diode, and light detecting circuitry 60 is a photo-Darlington transistor pair. However, it is within the scope of the invention to utilize various types of light sources and light detecting means.

Four signals are sent via an electrical connector 38 from the rear end of the pen through the shielded cable 40 to be coupled with the decoding circuitry at the far end of the cable. The four signals are:

a. ground from the decoding circuitry used to ground the pen housing and to connect to the amplifier and switch circuitry in the pen;

b. +12 volts from the decoding circuitry, used to connect to the amplifier and switch circuitry in the pen;

c. the amplifier output signal from the pen to the decoding circuitry; and d. the switch output signal from the pen to the decoding circuitry.

While the priciples of the invention have now been made clear in an illustrative embodiment, it is obvious that many modifications of structure, arrangement, proportions, materials, and components used in the practice of the invention may be made by those skilled in the art which are particularly adapted for specific environments and operating requirements without departing from those principles. Thus, the invention is to be construed as being limited only by the spirit and scope of the appended claims.

What is claimed is:

1. A sensing device for sensing an electrostatic field comprising:
    a pick-up element, having an extended body portion and a tip portion for sensing and re-radiating said electrostatic field;
    coupling means capacitively coupled to and surrounding a substantial portion of said body portion of said pick-up element to receive said re-radiated signal; said coupling means generating a corresponding signal;
    housing means for enclosing a substantial portion of said pick-up element and all of said coupling means, and
    amplifying means directly connected to said coupling means for amplifying said corresponding signal.

2. The sensing device of claim 1, wherein said housing means electrostatically shields said coupling means and the body portion of said pick-up element, whereby only a part of said tip portion of said pick-up element is exposed to said electrostatic field.

3. The sensing device of claim 1 further comprising writing means.

4. The sensing device of claim 3 wherein said tip portion of said pick-up element comprises the writing tip of said writing means and said extended body portion comprises the cartridge for said writing means.

5. The sensing device of claim 1 wherein said body portion of said pick-up element is a cylindrical member and said coupling means is a tubular member, said tubular member being disposed within said enclosing means so as to coaxially surround a substantial portion of said cylindrical member.

6. The sensing device of claim 1 further comprising switch means to provide an electrical indication that said sensing device is operative, said switch means substantially disposed within said enclosing means.

7. The sensing device of claim 6 wherein said switch means provides said electrical indication upon actuation by said pick-up element.

8. The sensing device of claim 6 wherein said switch means comprises a light emitting source and a light detecting means, said switch means adapted such that said electrical indication is provided when light from said source does not impinge upon said detecting means and said electrical indication is not provided when light from said source does impinge upon said detecting means.

9. The sensing device of claim 8 wherein said switch means is disposed with said enclosing means such that some part of said body portion will, upon inward axial displacement of said body portion obstruct the passage of light from said source to said detecting means and thereby provide said electrical indication, while upon outward axial displacement of said body portion, light from said source will impinge upon said detecting means and thereby not provide said electrical indication.

10. The sensing device of claim 9 wherein said light emitting source is a light-emitting diode and said light detecting means is a photo-Darlington transistor pair.

11. A writing pen capable of sensing an electrostatic field near its writing tip comprising:
    a. a writing tip for sensing said electrostatic field;
    b. a cylindrical member electrically coupled to said writing tip for re-radiating the electrostatic field sensed by said writing tip, said member having an outer surface;
    c. A tubular member coaxially surrounding said cylindrical member so as to capacitively couple the re-radiated electrostatic field from the tubular member to the cylindrical member;
    d. electronic amplification means coupled adjacent said outer surface of said cylindrical member, said amplification means electrically coupled to said cylindrical member, and adapted to electronically amplify the signal induced by the coupled electrostatic field;
    e. housing means operable for electrostatically shielding said cylindrical member, said tubular means and said amplification means and for exposing said writing tip to said electrostatic field.

f. switch means comprising a light emitting source and a light detecting means, said switch means disposed within said housing means such that some part of said cylindrical member will, upon inward axial displacement of said cylindrical member, obstruct the passage of light from said source to said detecting means and thereby provide electrical indication that said writing pen is operable, while upon outward axial displacement of said cylindrial member, light from said source will impinge upon said detecting means and thereby provide electrical indication that said writing pen is not operable.

12. The writing pen described in claim 11 wherein the cylindrical member and tubular member are a replaceable metallic pen cartridge.

13. The writing pen described in claim 11 wherein said electronic amplification means is mounted on said outer surface of said cylindrical member.

14. The writing pen described in claim 11 wherein said light emitting source is a light-emitting diode and said light detecting means is a photo-Darlington transistor pair.

* * * * *